United States Patent [19]
Sutton

[11] 3,963,962

[45] June 15, 1976

[54] MOTOR PROTECTOR

[75] Inventor: Walter T. Sutton, Lexington, Ky.

[73] Assignee: Texas Instruments Incorporated, Dallas, Tex.

[22] Filed: Dec. 18, 1973

[21] Appl. No.: 425,897

[52] U.S. Cl. .............................. 317/13 B; 318/473
[51] Int. Cl.² ........................................ H02H 7/08
[58] Field of Search ............ 317/13 R, 13 A, 13 B, 317/13 C; 310/48, 68 R, 68 C, 68 E; 318/462, 471, 473, 528, 221 C, 221 H

[56] References Cited
UNITED STATES PATENTS

| 1,997,673 | 4/1935 | Boothby | 318/473 |
|---|---|---|---|
| 2,165,082 | 7/1939 | Weber | 318/473 |
| 2,166,323 | 7/1939 | Raney | 318/473 |
| 3,023,350 | 2/1962 | Broadley et al. | 317/13 C |
| R22,973 | 2/1948 | Kurtz | 318/473 |

Primary Examiner—J D Miller
Assistant Examiner—Patrick R. Salce
Attorney, Agent, or Firm—John A. Haug; James P. McAndrews; Russell E. Baumann

[57] ABSTRACT

A motor protector for a split-phase motor having a starting switch, the arm of which is connected to the run winding and which moves from a first position in engagement with a first contact to energize the start winding into a second position in engagement with a second contact thereby to deenergize said start winding upon the motor attaining a predetermined starting speed. The protector includes a thermostatic element to be positioned in heat-exchange relationship with the motor windings and which is heated by the flow of electrical current therethrough. It has a first curvature position at ambient temperatures and moves to a second curvature position at an elevated predetermined temperature. The protector further includes a switch having contacts which are opened in response to movement of the thermostatic element into its second curvature position. The thermostatic element is serially connected with the contacts of the latter switch in a circuit between one terminal of an a.c. power source and the switch arm, and the thermostatic element is shunt-connected across said switch arm and the aforesaid second contact. While the motor is operating below its starting speed, the thermostatic element is responsive to motor overcurrent conditions that cause self-heating of the element to the elevated predetermined temperature thereby to open the contacts of the switch and deenergize the motor windings. While the motor is operating at speeds in excess of its starting speed the motor current is shunted around the thermostatic element and is responsive to its temperature rising above the pedetermined elevated temperature substantially as a sole function of the motor winding temperature thereby to move into its second position and open the switch contacts to deenergize the motor windings.

4 Claims, 2 Drawing Figures

MOTOR PROTECTOR

BACKGROUND OF THE INVENTION

This invention relates to motor protectors and more particularly to protectors for split-phase motors in which the usual motor starting switch is utilized to effect masking of the current-biasing or self-heating effects of motor current through the protector's thermostatic element during running mode operation.

Motor protectors of many different types have long been used to protect motors from damaging overtemperature conditions such as would be caused by sudden massive overloads due to a locked rotor or a long-term overcurrent condition where the temperature of the motor eventually rises to a level that would damage the motor if continued, e.g., an ultimate trip current condition. Numerous approaches have been taken with varying degrees of success to provide protectors which will satisfactorily protect against these two quite different types of motor overload conditions. At the same time, motor standards have been uprated and cost economies in motor design have been made so that all motor materials must work harder. This has imposed increasingly stringent requirements and constraints on the motor protector designer and manufacturer in producing improved performance protectors at minimal expense and has hampered further economies in motor design and construction.

SUMMARY OF THE INVENTION

Among the several objects of this invention may be noted the provision of motor protectors which have improved performance in detecting the faster rate-of-rise temperatures of uprated motors and more accurate time-current integration to anticipate such rate-of-rise and shut down the motor before an unsafe motor temperature condition can develop; the provision of such motor protectors which permits more independent and precise sensing and handling of high short-term overcurrent motor conditions, such as a locked rotor, and lower long-term overcurrent problems, such as an ultimate condition; the provision of such motor protectors which utilize an existing motor component to perform a motor protector function; and the provision of such motor protectors which are economical to produce and permit economies in the cost of the motors in which they are installed. Other objects and features will be in part apparent and in part pointed out hereinafter.

Briefly, a motor protector of this invention comprises a thermostatic element which is positioned in heat-exchange relationship with the windings of a split-phase motor and is also heated by the flow of electrical current therethrough. This element has a first curvature position at ambient temperatures and moves to a second curvature position at an elevated predetermined temperature. It further includes a switch with contacts which are opened in response to movement of the thermostatic element into its second curvature position. The thermostatic element is serially connected with the contacts of that switch in a circuit between one terminal of an a.c. power source and the switch arm of the usual split-phase motor starting switch. The thermostatic element is shunt-connected across said switch arm and a contact of the starting switch which closes when the motor reaches a predetermined starting speed. While the motor is operating below its starting speed the thermostatic element is responsive to motor overcurrent conditions that cause self-heating of the element to the elevated predetermined temperature thereby to open the contacts of the protector switch and deenergize the motor windings. While the motor is operating at speeds in excess of its starting speed, the motor current is shunted around the thermostatic element and it is responsive to its temperature rising above the predetermined elevated temperature substantially as a sole function of the temperature of the motor windings thereby to move into its second position and open the contacts of the protector switch to deenergize the motor windings.

BRIEF DESCRIPTION OF THE DRAWINGS

Corresponding reference characters indicate corresponding parts throughout the several view of the drawings.

DESCRIPTION OF A PREFERRED EMBODIMENT

Figure 1:
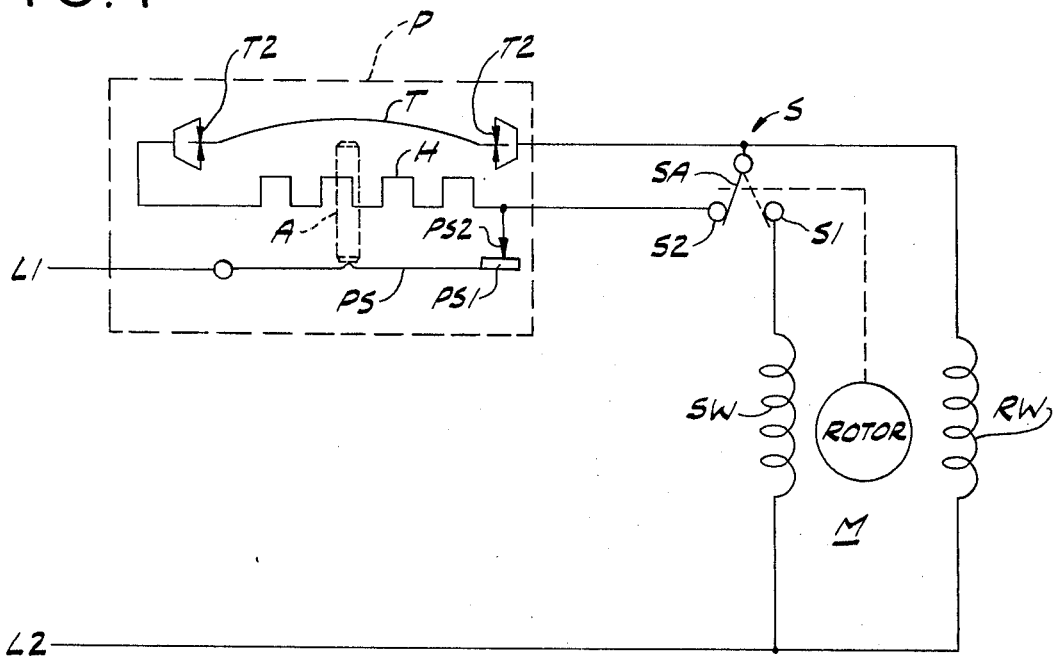
FIG. 1 is a diagrammatic view illustrating a motor protector of this invention connected with a split-phase motor.

Referring now to the drawings, a conventional split-phase a.c. motor is generally indicated at M with its start and run windings being shown at SW and RW. The usual motor starting switch is indicated at S. This is typically a centrifugally operated switch having a switch arm SA which moves from engagement with a first contact S1 into engagement with a second contact S2 when the motor attains a predetermined starting speed. Switch S may be any of the other types of starting switches used for this purpose, such as an electromagnetic relay type. Switch arm SA is connected to one side of the run winding RW and also to a thermostatic element T positioned in good heat exchange relationship with the motor windings, e.g., in or on the windings. T is preferably a bimetallic dish-shaped body, such as a disc, and has a desired electrical resistivity so that it will generate heat as a function of the magnitude of motor current flowing therethrough between two terminals thereof indicated at T1 and T2. Terminal T2 is connected through an optional electrical resistance heater H, positioned in heat exchange relationship to thermostatic element T, and contacts PS1 and PS2 of a protector switch PS to one terminal L1 of a conventional a.c. supply. The junction of heater H and contact PS2 is connected to starting switch contact S2 so that the thermostatic element T (and, optional heater H) will be shunted by the switch arm SA when it engages contact S2. The other side or terminal L2 of the a.c. power source is commonly connected to the remaining sides or terminals of the run and start windings. An actuator pin A mechanically couples thermostatic disc T and switch PS. Thus an actuator P of this invention includes the thermostatic element T and switch PS actuatable thereby, and, optionally, electric heater H. However, it utilizes a function of the existing motor starting switch S in its operation.

Figure 2:
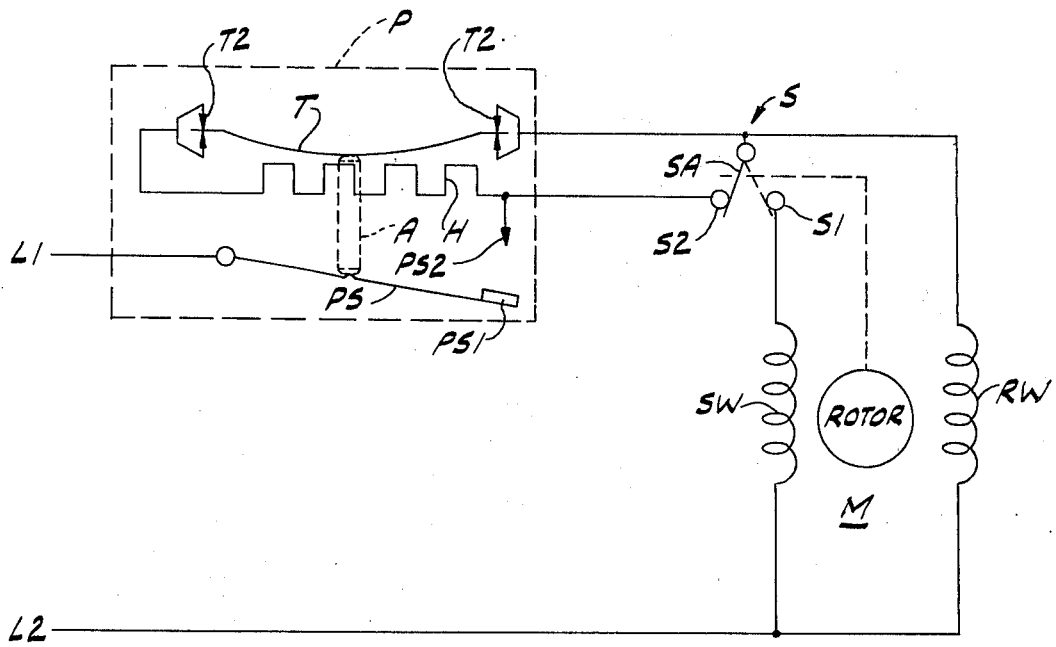
FIG. 2 is a similar view of the protector of FIG. 1 but with the protector tripped to deenergize the motor to protect it from damage by excessive temperatures.

Operation is as follows: With the protector P positioned in the motor M as described, and with a.c. power being supplied by lines L1, L2, switch arm SA will initially be engaged as shown by its dashed line position, with contact S1 thereby energizing both windings SW and RW until the motor reaches a predetermined starting speed. At that time, switch arm SA will move to its solid line position against contact S2. In the event motor M develops a fault, or a locked rotor condition exists, so that motor M does not come up to speed, switch arm SA remains in contact with S1 and the excessive current flow through T causes rapid self-heating which may be supplemented by the heat generated by optional heater H. Thus the temperature of T will rise rapidly to its trip temperature whereupon it abruptly reverses curvature, as shown in FIG. 2, moving actuator pin A against the switch arm of switch PS to open its contacts PS1,PS2 thereby deenergizing motor M and preventing overheating of the windings thereof. The same action will take place if an overload occurs during running operation of the motor and the overload slows the motor below the point at which arm SA of start switch S moves back into its dashed line position.

During normal running operation of the motor, the shunting action of switch S effectively eliminates current flow through element T and heater H so that T may sense the true temperature of the winding and any biasing effects of self-heating of element T due to current flow therethrough are avoided. Thus the temperature of T in this mode of operation is essentially a sole function of winding temperature and T functions as a thermostat. Any increase in winding temperature for any reason, such as an ultimate trip condition, will cause disc T to reverse its curvature to the FIG. 2 position, open switch PS and so deenergize motor M.

It will be noted that the elimination of current flow through element T when the motor is in its running mode while utilizing it for self- and supplementary heating of disc T when the motor is in its starting mode, permits the protector to relatively independently sense and handle both long- and short-term overload conditions and be made so as to more precisely meet each of the quite different protection needs. Thus the parameters of the heater and the resistivity of element T can be made such that the temperature of the motor under massive short-term overloads can be conveniently matched so that the tripping of T can be made to more precisely and closely anticipate it. And for long-term overload conditions, such as ultimate trip, the protector thermostatic element T, without any current biasing action, may be calibrated to quite accurately open at a temperature just low enough to prevent the motor windings from exceeding a preselected temperature above which damage would occur. This more precise matching of the protector characteristics to those of the motor avoids the need of providing extra material and tolerances in the design and construction of the motor so as to safeguard against less precise performance by the protector. Thus the motor may be more closely designed so that perhaps a smaller size conductor may be used for its windings, etc., and other cost saving economies effected. Moreover, the use of the usual starting switch of split-phase motors to provide an important function of the protector, i.e., the shunting action during running, permits an additional economy in the cost of the motor-protector combination.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A motor protector for a split-phase motor having start and run windings and a start switch having a switch arm connected to the run winding and which moves from a first position in engagement with a first contact to energize the start winding into a second position in engagement with a second contact thereby to deenergize said start winding upon the motor attaining a predetermined starting speed, said protector comprising a thermostatic element adapted to be positioned in heat-exchange relationship with said windings and to be heated by the flow of electrical current therethrough, said element having a first curvature position at ambient temperatures and moving to a second curvature position at an elevated predetermined temperature, and a switch having contacts which are opened in response to movement of said thermostatic element into its second curvature position, said thermostatic element adapted to be serially connected with the contacts of the last said switch in a circuit between one terminal of an a.c. power source and the switch arm, said thermostatic element adapted to be shunt-connected across said switch arm and said second contact whereby while the motor is operating below its starting speed the thermostatic element is responsive to motor overcurrent conditions that cause self-heating of the element to the elevated predetermined temperature thereby to open the contacts of the last said switch and deenergize the motor windings, and whereby while the motor is operating at speeds in excess of said starting speed the motor current is shunted around the thermostatic element and is responsive to its temperature rising above the predetermined elevated temperature substantially as a sole function of the temperature of said windings thereby to move into its second position and open the contacts of the last said switch to deenergize the motor windings.

2. A motor protector as set forth in claim 1 which further includes an electrical resistance heater in heat-exchange relationship with said thermostatic element and serially connected in said circuit wherein both the thermostatic element and said heater are shunt-connected across said switch arm and the second contact whereby while the motor is operating below its starting speed the temperature of the thermostatic element is also a function of the heat generated by the flow of motor current through said heater.

3. A motor protector as set forth in claim 2 wherein the thermostatic element is a snap-acting bimetallic thermostatic dished body which abruptly snaps from its first into its second curvature positions upon its temperature increasing above the predetermined temperature and will abruptly snap from its second into its first curvature position upon its temperature falling to a second predetermined temperature below the first said predetermined temperature.

4. A motor protector as set forth in claim 3 which further includes an actuator pin coupling the thermostatic body and the last said switch for substantially conjoint movement.

* * * * *